United States Patent [19] [11] 4,414,432
Skerlos et al. [45] Nov. 8, 1983

[54] PSEUDO-FULL DUPLEX TELEVISION/TELEPHONE LOUDSPEAKER SYSTEM

[75] Inventors: Peter C. Skerlos, Arlington Heights; Thomas J. Zato, Palatine, both of Ill.

[73] Assignee: Zenith Radio Corporation, Glenview, Ill.

[21] Appl. No.: 304,226

[22] Filed: Sep. 21, 1981

[51] Int. Cl.³ .......................................... H04M 11/08
[52] U.S. Cl. ............................. 179/2 TV; 179/81 B; 179/100 L; 358/85
[58] Field of Search ............... 179/1 FS, 1 HF, 2 TV, 179/81 A, 81 B, 170 NC; 358/85

[56] References Cited

U.S. PATENT DOCUMENTS

| | | |
|---|---|---|
| 2,766,378 | 10/1956 | Sundin et al. |
| 3,899,643 | 8/1975 | Tabalba ........................... 179/81 B |
| 3,908,094 | 9/1975 | Deluegue ......................... 179/81 B |
| 3,987,254 | 10/1976 | Pipitone .......................... 179/81 B |
| 4,087,636 | 5/1978 | Akiyama et al. |
| 4,113,996 | 9/1978 | Sanderson ..................... 179/170 NC |
| 4,192,978 | 3/1980 | Vincent ........................ 179/81 B X |
| 4,225,754 | 9/1980 | Bernard et al. |
| 4,251,689 | 2/1981 | Hastings-James et al. |
| 4,338,492 | 7/1982 | Snopko ............................ 179/2 TV |

FOREIGN PATENT DOCUMENTS 52-55415 5/1977 Japan ............................... 179/81 A

OTHER PUBLICATIONS

"MN 1400 Series: 4-Bit One-Chip Microcomputer" published by Matsushita Electronics Corporation.
"2920-16 Signal Processor" published by Intel Corporation.

Primary Examiner—G. Z. Rubinson
Assistant Examiner—Keith E. George

[57] ABSTRACT

A television/telephone loudspeaker system is disclosed wherein feedback oscillation caused by having a speaker phone system simultaneously in the transmit and receive mode is minimized. Improved separation of transmit and receive signals is accomplished by microprocessor-controlled dynamic balancing of a bridge network coupled to a telephone isolation transformer to which the incoming and outgoing calls are provided. In addition, by microprocessor sampling of the television receiver's loudspeaker drive voltage from the telephone input line, dynamic proportional attenuation of microphone gain (AGC) is digitally accomplished in simulating full duplex operation. Bridge balancing is accomplished by means of test signals output by the microprocessor during quiet periods with various other audio signal refinements, such as room background noise cancellation, available with the constant monitoring of the microphone signal. Audio and visual indications of an incoming telephone call are provided by the television receiver's tuning system microcomputer which detects and decodes user remote commands and activates a phone relay and phone light emitting diode (LED) drivers.

17 Claims, 1 Drawing Figure

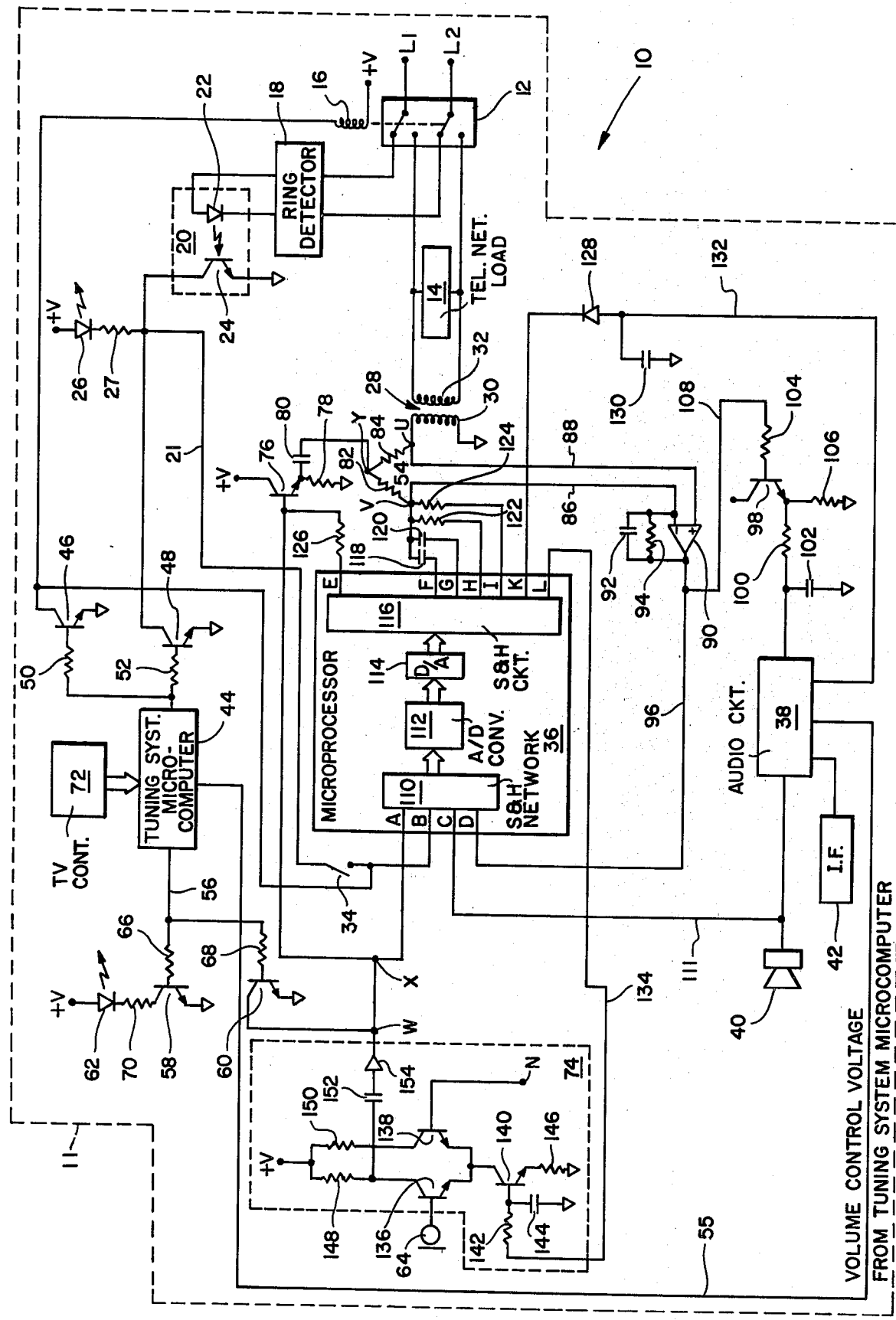

PSEUDO-FULL DUPLEX TELEVISION/TELEPHONE LOUDSPEAKER SYSTEM

CROSS-REFERENCE TO RELATED APPLICATIONS

This application is related to the following copending applications which are assigned to the assignee of the present application: Ser. No. 109,424, filed Jan. 2, 1980, entitled "Television Receiver With Two-way Telephone Conversation Capability" in the name of Paul Snopko and issued as U.S. Pat. No. 4,338,492; Ser. No. 175,456, filed Aug. 5, 1980, entitled "Television Receiver With Two-way Telephone Conversation and Dial-out Capabilities" in the name of Paul Snopko; and issued as U.S. Pat. No. 4,349,701 and Ser. No. 243,010, filed Mar. 12, 1981, entitled "Microcomputer-Controlled Television/Telephone System and Method Therefor" in the names of Peter C. Skerlos, Paul A. Snopko, Frank C. Templin and Thomas J. Zato and issued as U.S. Pat. No. 4,356,509, the disclosures of which are expressly incorporated herein by reference.

BACKGROUND OF THE INVENTION

This invention generally relates to a telephone loudspeaker systems and more specifically is directed to a pseudo-full duplex telephone loudspeaker system especially adapted for use in a conventional television receiver.

Standard telephone communication is of the full duplex type providing for the simultaneous communication in both directions between the called and the calling parties. Full duplex communication, however, is not available in a loudspeaker telephone system because of its component configuration and resulting operating characteristics.

For example, audio signals emitted by the system's loudspeaker impinge on the microphone, either by direct or indirect accoustic coupling. This results in an accoustic echo signal being produced at the microphone resulting in the generation of self-oscillations in system circuitry which produces howling noises causing a degradation of the communications link.

In addition to this accoustic coupling between the loudspeaker output and the resulting unwanted input to the microphone, electrical coupling between the transmission and reception channels degrades loudspeaker telephone communications. Typically, a loudspeaker telephone system includes a signal transmission channel incorporating a high gain amplifier connecting a microphone to a two-wire telephone subscriber line. A reception channel also incorporating a high gain amplifier connects the subscriber line to the loudspeaker. A differential coupler, such as an isolation transformer, is used to connect the transmission and reception channels to the subscriber line, and is intended to prevent signal leakage between the transmission and reception channels. However, because local telephone line impedance varies from site to site and even from time to time as various load, such as additional telephone extensions, are imposed on the telephone network, the impedance of the differential coupler is seldom a perfect match with that of the telephone system. Consequently, the transmission signals break through into the reception channel resulting in an electrical echo signal being present in the reception channel.

Improved isolation between the transmission and reception channels is generally provided to reduce the electrical echo signal. One of the best known approaches to minimizing the effects of acoustic echoes in a loudspeaker telephone system involves introducing a certain level of attenuation into the transmission channel or the reception channel, depending on whether the distant or local end subscriber is speaking. This method uses so-called "voice-operated gain adjusting devices" to operate the equipment in alternate modes, i.e., in transmission or in reception.

One approach to an automatic switching device for a communications system is disclosed in U.S. Pat. No. 2,766,378 to Sundin et al wherein is described an automatic switching device actuated in response to a DC voltage exceeding a certain threshold potential and which for its duration causes an amplifier for a second signal to be non-conducting. Thus, a changeover takes place from the second signal to the first signal with the first signal acquiring predominance over the second signal by an increase in the gain of an amplifier for the first signal together with a simultaneous suppression of the second signal initiated by an audio input provided to the first signal's amplifier.

Another audio signal-actuated switching scheme is disclosed in U.S. Pat. No. 4,087,636 to Akiyama et al involving a transmit-receive circuit changing switch system which is operated by a signal produced by a switching signal generator from a low frequency signal produced by the operator's voice. The system is intended to eliminate the need for a press-to-talk manual switch, the function of which is accomplished by means of antenna and microphone-coupled transducer changeover switches controlled by an electroacoustic transducer change-over switch. The change-over signal generator circuit is responsive to a received audio signal and configures the system in a receiving mode of operation. When the received audio signal is no longer detected, the system reverts to a signal transmission mode of operation. The audio frequency signal provided at the output of the receiver is prevented from entering the switching signal generator by means of the transducer change-over switch which isolates the input of the audio frequency amplifier from the output of the receiver.

The above-discussed patents are examples of so-called "voice-operated gain adjusting devices" for operating communications equipment in alternating modes of receive and transmit. As such, these systems suffer from limitations generally inherent in such communication links. For example, if the operating mode switch-over function operates at high speed, the conversation becomes unpleasant with speech being cut up into separate syllables and brief noises resulting in unnecessary switching operations. If the operating mode switching is too slow, the initial portion of a conversation will likely be lost, such as the first one or more syllables of a reply, with the other party not being able to break in and the reception channel of the speaking party being rendered totally inactive.

U.S. Pat. No. 4,225,754 to Bernard et al discloses a loudspeaker telephone system intended to eliminate spurious noises caused by circuit oscillation due to transmitreceive signal feedback. The transmission and reception channels are decoupled by means of first and second adaptive transversal signal filters incorporated in the reception and transmission channels. These adaptive transversal filters use the outputs of their respective channels to synthesize an acoustic echo signal component present in the output from that channel with its combining circuit subtracting the real and synthetic echo signal components from each other to reduce the acoustic echo signal component in the respective channel to a residual level. In an alternate embodiment, both transversal filters may be embodied in a single filter circuit operating on a time-sharing basis. U.S. Pat. No. 4,251,689 to Hastings-James et al involves a loudspeaker telephone apparatus wherein the loudspeakers are used as bi-directional receive and transmit transducers. Under normal conditions, the gain of the receive amplifier is at a maximum value and that of the transmit amplifier at a minimum value. Under quiescent conditions speech entering the microphone circuit switches the receive amplifier to its "off" condition and the transmit amplifier to its "on" condition. The set is thus voice-switched from the receive condition to the transmit condition. When the voice signal stops, the receive amplifier will return to its maximum gain or "on" and the transmit amplifier will return to minimum gain or "off". This is accomplished by means of a bridge circuit in the separate branches of which are connected the coils of the loudspeakers, one of which is coupled in a series-aiding configuration and the other is coupled in a series-bucking configuration. The telephone line is connected to the balanced bridge by means of the receive and transmit amplifiers. The amplifier to be turned on is deterined by the balanced status of the bridge circuit with one amplifier turned "on" when the bridge is balanced and the other turned "on" when the bridge is unbalanced. The referenced loudspeaker telephone systems are designed to address specific problems in such systems. The first apparatus is designed specifically to minimize speaker system oscillations caused by acoustic signal feedback while the second system is intended to provide a multi-point telephone conferencing system wherein no isolation between the transmit and receive signals is required since the loudspeaker is used for processing both signals.

The present invention is more general in its application than the aforementioned approaches and provides a pseudo-full duplex telephone loudspeaker communication system compatible with and easily installed in a conventional television receiver. Improved electrical and acoustical isolation between the transmit and receive signals is accomplished by means of a microprocessor which samples these signals at a high rate and provides signal amplitude corrections therefor.

OBJECTS OF THE INVENTION

Accordingly, it is an object of the present invention to provide an improved telephone loudspeaker system.

It is another object of the present invention to provide a pseudo-full duplex telephone loudspeaker system integrated in a conventional television receiver.

Still another object of the present invention is to provide a television/telephone loudspeaker system with automatic gain control (AGC).

A further object of the present invention is to provide a microprocessor controlled telephone loudspeaker system with enhanced transmit and received signal isolation for simulated full duplex operation.

A still further object of the present invention is to provide a television/telephone loudspeaker system employing high rate microprocessor sampling of the transmit and receive signals for continuous signal gain adjustment and filtering.

A still further object of the present invention is to provide a digital telephone loudspeaker system particularly adapted for use in a conventional television receiver with a pseudo-full duplex operating mode.

BRIEF DESCRIPTION OF THE DRAWING

The appended claims set forth those novel features believed characteristic of the invention. However, the invention itself as well as further objects and advantages thereof will best be understood by reference to the following detailed description of a preferred embodiment taken in conjunction with the accompanying drawings which shows in schematic diagram form and block diagram form a pseudo-full duplex television/telephone loudspeaker system in accordance with the present invention.

DESCRIPTION OF THE PREFERRED EMBODIMENTS

Referring to the FIGURE, there is shown a pseudo-full duplex television/telephone loudspeaker system 10 in accordance with the present invention. The system of the present invention may be included within a television receiver 11, with only those components of a conventional television relevant to the present invention shown in the FIGURE. A two-wire telephone network comprised of conductors L1, L2 is coupled to phone relay 12. The telephone network load is designated as item 14 and is required to gain and maintain access to the central office when connected to the two wire telephone line. The impedance characteristics of the two wire telephone line varies from one telephone location to another and may even vary at a given telephone location by changes in network loading such as by using an extension telephone which is connected to the given telephone line. When an incoming call is received on telephone lines L1, L2, the signal is transmitted through telephone relay 12 to ring detector circuit 18, as shown in the FIGURE. Ring detector circuit 18, in turn, provides a ring signal to photo-diode 22 in opto-coupler 20. Also included in opto-coupler 20 is photo-transistor 24 which responds to the emitted optical signal from photo-diode 22 in generating its own output ring signal. The output of photo-transistor 24 is provided to telephone LED 26 which affords the television viewer a visual indication of the incoming telephone call. Resistor 27 is coupled to the cathode of the photo-diode phone LED 26 for proper diode turn-on biasing. Telephone relay 12 and opto-coupler 20 provide the isolation between the high voltages employed in the television receiver and telephone lines L1, L2 to meet Federal Communications Commission Part 68 criteria.

While a visual indication of a received telephone signal is provided by means of phone LED 26 in response to an output from opto-coupler 20, an audio indication is provided if ring defeat switch 34, which also is coupled to opto-coupler 20 by means of line 21, is engaged. With ring defeat switch 34 engaged, the ring signal is provided from opto-coupler 20 to microprocessor 36 and then, by means of the K output of microprocessor 36 to television receiver audio circuitry 38 and television receiver speaker 40. Upon receipt of an incoming telephone signal with ring defeat switch 34 engaged, audio circuitry 38 is switched from processing normal television audio from intermediate frequency (IF) circuitry 42 to processing an electronically generated ring tone provided by microprocessor 36.

The telephone is answered by having the television receiver's tuning system microcomputer 44 detect and decode a remote command and activate the phone relay 12. Tuning system microcomputer 44 and its operation in carrying out these and other functions considered below are described in detail in co-pending U.S. patent application Ser. No. 243,010 identified above. The telephone control signal output from microcomputer 44 initiated in response to a received telephone signal is provided to phone relay transistor 46 and phone drive transistor 48. With current limiting resistors 50, 52 coupled to the respective base of each of these transistors, phone relay transistor 46 buffers the output of microcomputer 44 to the coil 16 of telephone relay 12 while phone drive transistor 48 buffers the output of microcomputer 44 to telephone LED 26. Thus, phone drive transistor 48 energizes phone LED 26 in providing a continuous visual indication during a telephone conversation while phone relay transistor 46 energizes coil 16 in switching phone relay 12 from ring detector circuit 18 to the phone load 14 of television/telephone loudspeaker system 10. This switching action terminates the ring signal output from speaker 40 and couples telephone lines L1, L2 to transformer 28 in preparation for the transmission of the audio information portion of the incoming telephone signal.

The receive telephone signal is thus provided to primary coil 32 of coupling transformer 28 to which is inductively coupled secondary coil 30. The differentially coupled receive signal is then provided to point U in one branch of balanced bridge circuit 54. The operation of balanced bridge 54 will be described presently.

A viewer-initiated volume control signal is provided by tuning system microcomputer 44 via line 55 to television receiver audio circuitry 38 for controlling television receiver audio signal level during television operation and speaker phone volume during telephone operation. A privacy mode signal is also available to the viewer and provided by tuning system microcomputer 44 via line 56 to transistors 58 and 60. With transistor 58 rendered conducting by means of the output on line 56 from microcomputer 44, privacy LED 62 is turned on and provides the user with a visual indication of the selection of the privacy mode. Similarly, selection of the privacy mode by the user renders transistor 60 conducting, resulting in the grounding by means of transistor 60 of the audio signal input provided to microphone 64. Resistors 66 and 68, respectively, limit the output signal provided by microcomputer 44 to transistors 58 and 60. Resistor 70 provides proper biasing for privacy LED 62.

User inputs are provided from various television receiver controls 72 to tuning system microcomputer 44. These television receiver controls 72 may be either located on or attached to the receiver or may be remotely located and coupled to the television receiver by means of an ultrasonic or infrared link. A detailed description of the operation of microcomputer 44 in the television receiver's tuning system and in the pseudo full duplex television/telephone loudspeaker system 10 of the present invention is not provided herein since it does not form a part of the present invention. However, a detailed description of its operation in the television receiver and telephone communications system is provided in the above-referenced patent applications, the disclosures of which are incorporated herein by reference.

A detailed description of the configuration and operating characteristics of the microcomputer utilized in a preferred embodiment of the present invention is provided in the publication "Microcomputer and Peripheral LSI's", published by the Panasonic Company, a division of Matsushita Electric Corporation of America. The preferred microcomputer chip is of the Matsushita MN 1400 Series basic design which is a four-bit E/D MOS unit with a ROM, a RAM, an arithmetic logic unit, input/output ports, and a clock generator on a single semiconductor chip. Tuning system microcomputer 44 stores data, periodically updates this stored data, compares both stored and real-time data and makes decisions based upon these comparisons in providing various control signals to television/telephone loudspeaker system 10.

The audio signal transmitted to microphone 64 is gain adjusted via AGC circuit 74 and then provided to point W. At point W, the signal is split and provided to transistor 60 as previously described and is also provided to point X. At point X, the audio transmit signal is again split and provided to transistor 76 and to the A input line of microprocessor 36. An audio input provided to the base of transistor 76 renders it conducting with its output provided to point Y of bridge circuit 54. Resistor 78 couples the emitter of transistor 76 to ground for proper transistor biasing while capacitor 80 provides for AC coupling between the emitter of transistor 76 and bridge circuit 54.

The transmit telephone signal is provided to point Y of balanced bridge 54 by means of transistor 76 while the receive telephone signal is provided to point U of bridge circuit 54 by means of coupling transformer 28. From point U in bridge circuit 54, the receive telephone signal is provided via line 88 to differential amplifier 90 and thence to buffer transistor 98. The receive telephone signal is then low pass filtered by means of resistor 100 and ground-coupled capacitor 102. Resistors 104, 106 perform current limiting and biasing functions, respectively, for buffer transistor 98. The output of the low pass filter is then provided to television audio circuitry 38 for processing and thence to loudspeaker 40.

When bridge circuit 54 is balanced such that the respective impedances associated with the U and V branches thereof are equal, an audio transmit signal provided to point Y will produce equal outputs in lines 86 and 88. In addition, the audio transmit signal will be provided via point U in bridge circuit 54 to primary coil 30 of coupling transformer 28 and thence to secondary coil 32 from which it is transmitted to telephone lines L1, L2 via phone relay 12. With bridge circuit 54 balanced, an audio transmit signal provided to point Y therein will result in equal signal levels in lines 86, 88, both of which are coupled to the inputs of differential amplifier 90. As a result, differential amplifier 90 will produce no output signal and no portion of the transmit audio signal will be provided to speaker 40, thus eliminating acoustic feedback and the circuit oscillations produced thereby. When bridge 54 is unbalanced, there will be a signal difference between lines 86 and 88 upon the arrival of an audio transmit signal at point Y and differential amplifier 90 will provide an output signal to television audio circuitry 38 and loudspeaker 40 via line 108. This output signal will be fed back into microphone 64 producing undesirable speaker system oscillations or improper switching between transmit and receives modes. Thus, the key to minimizing or even eliminating these problems is in the balancing of bridge circuit 54.

The output of differential amplifier 90 is also provided via line 96 to the D input of microprocessor 36. Similarly, a loudspeaker feedback signal is provided to the C input of microprocessor 36 via line 111. Thus, four input signals are provided to the A, B, C and D input ports of microprocessor 36. The input signals are, respectively: the microphone audio transmit signal, the telephone ring signal, the loudspeaker signal, and the receive audio signal.

The input channels of microprocessor 36 consist of four analog sampling switches which use a common external sampling capacitor (not shown). This input sample and hold network 110 permits the sampling of the four analog input signals which are then digitized by means of analog-to-digital converter 112 for digital processing. This digital processing includes signal level comparisons with previous, stored signal levels and the generation of signals representing the difference between various measured signal levels. Microprocessor logic provides for the generation of digital signals representing these signal level differences which are converted back to analog form by means of digital-to-analog converter 114. The analog control signals are then provided to output sample and hold circuitry 116 which includes a plurality of analog output channels each including a sample and hold circuit demultiplexed from a common buffered D/A output. The microprocessor utilized in a preferred embodiment of the present invention is the Intel Corporation's 2920-16 Signal Processor which is a programmable, single chip analog and digital signal processor.

A test signal is provided by microprocessor 36 at its E output to correct for unbalanced bridge conditions between periods of speech. This signal is derived by means of the signal provided to input D of microprocessor 36 and adjustments are made by means of the program logic stored in microprocessor 36 for selectively providing output control signals on microprocessor outputs F, G, H and I. These output signals selectively couple capacitor 118, capacitor 120, resistor 122 or resistor 124 to the V terminal of one branch of bridge circuit 54. In this manner, by sampling the output of differential amplifier 90, microprocessor 36 varies the impedance in one branch of bridge circuit 54 in balancing the bridge circuit with respect to telephone line impedance thereby minimizing the feedback of the audio transmit signal from loudspeaker 40 to microphone 64. As a result, speaker system oscillation due to microphone feedback is eliminated, thus enhancing communications link performance. Resistor 126 coupled between microprocessor 36 and the base of buffer transistor 76 limits the test signal amplitude applied thereto.

An output signal is generated by microprocessor 36 at the K output terminal and is provided on line 132 to television receiver audio circuitry 38 by means of diode 128 and filter capacitor 130 in switching television receiver audio circuitry from television audio to telephone audio. The signal thus provided to audio circuitry 38 for changing its mode of operation is generated in microprocessor 36 in response to the television viewer selecting the telephone mode of operation by means of user control block 72 with tuning system microcomputer 44 relaying this command to microprocessor 36 via phone relay transistor 46 and microprocessor input terminal B.

An automatic gain control (AGC) signal is provided at the L output of microprocessor 36 to AGC circuit 74. The input to microprocessor 36 which permits the monitoring of the audio output of microphone 64 for AGC adjustment is provided at the A input terminal of microprocessor 36. The L output of microprocessor 36 is coupled by means of line 134 to AGC circuit 74.

The microphone output signal is provided to the base of transistor 136 in AGC circuit 74. Transistor 136 in combination with transistor 138 form an emitter-coupled differential amplifier with current source wherein transistor 140 acts as a current source. The base of current source transistor 140 is coupled by means of grounded filter capacitor 144 and current determining resistor 142 to the AGC feedback line 134. Grounded resistor 146 provides proper biasing for transistor 140. A reference threshold voltage source is coupled to the base of transistor 138 via point N. When the microphone input to transistor 136 exceeds this reference threshold voltage, an audio output signal is provided to buffer amplifier 154 via AC coupling capacitor 152 from the collector of transistor 136. The collectors of differential amplifier transistors 136, 138 are coupled by means of resistors 148, 150 respectively to a positive voltage source. Resistors 148, 150 act as a desensitizing network in reducing the switching rate of transistors 136, 138 over a given voltage range. This has the effect of smoothing out the gain of the differential amplifier over that voltage range. The output of buffer amplifier is provided to points W, X and thence to microcomputer 36 and transistor 76 and processing as previously described.

There has thus been described a pseudo-full duplex television/telephone loudspeaker system in which the audio transmit signal is completely isolated from loudspeaker output thereby eliminating spurious audio inputs to a television-mounted microphone in improving communications link performance. High rate microprocessor sampling of the input microphone signal and the speaker output signal permit the continuous balancing of a bridge network which carries both transmit and receive signals and which is connected to a telephone line differential coupler. The microphone output transmit signal is passed through an automatic gain control circuit under the control of the microprocessor which continuously samples transmit signal level. Control inputs to the microprocessor are provided by a microcomputer integrated in the television receiver's tuning system which is responsive to user selectable control signals. The present invention is not limited to the specific details provided herein. For example, any source of impedance could be coupled to the bridge circuit 54 at point V. Similarly, a signal processing scheme for eliminating audio signal background noise from the microphone input could easily be practiced by one reasonably skilled in the pertinent arts in view of the disclosure provided herein, particularly as it relates to audio signal processing by microprocessor 36.

While particular embodiments of the present invention have been shown and described, it will be apparent to those skilled in the art that changes and modifications may be made therein without departing from the invention and its broader aspects. The aim in the appended claims, therefore, is to cover all such changes and modifications as fall within the true spirit and scope of the invention.

We claim:

1. In a television receiver including a microcomputer-controlled tuning system, said microcomputer responsive to user selected input commands for generating control signals, said television receiver further including a microphone and a loudspeaker and coupled to a two-wire telephone line, a pseudo-full duplex telephone system comprising:

ring detection means for detecting an incoming ring signal;

differential coupling means;

switch means selectively coupling said ring detection means and said differential coupling means to said telephone line, said switch means coupled to said microcomputer and responsive to control signals therefrom for decoupling said ring detection means from said telephone line and coupling said differential coupling means thereto following detection of an incoming ring signal in response to a user selected input command;

line balance means connecting said microphone to said differential coupling means for providing an audio signal received by said microphone to said telephone line and connecting said differential coupling means to said loudspeaker for providing a received telephone signal to said loudspeaker;

variable impedance means connected to said line balance means for varying the impedance thereof in accordance with the impedance of said telephone line; and signal processing means coupled to said variable impedance means and to said line balance means and responsive to an output signal provided by said line balance means to said loudspeaker during the transmission of an audio signal from said microphone to said telephone line for selectively coupling said variable impedance means in circuit with said line balance means in matching the impedance of said telephone system with that of said telephone line.

2. The system of claim 1 wherein said switch means comprises an electromagnetic relay.

3. The system of claim 1 wherein said ring detection means includes means for providing a visual and audio indication to said user of an incoming ring signal.

4. The system of claim 1 further including signal control means coupled to said microcomputer and said microphone for muting an audio signal from said microphone in response to a user selected input command.

5. The system of claim 4 further including display means coupled to said signal control means for providing a visual indication to said user of the muting of an audio signal from said microphone.

6. The system of claim 1 including audio switching means coupling said line balance means to said loudspeaker and coupled to said microcomputer for automatically decoupling television audio signals and coupling telephone signals to said loudspeaker in response to a control signal from said microcomputer following detection of an incoming ring signal.

7. In a television receiver including a microcomputer-controlled tuning system, said microcomputer responsive to user selected input commands for generating control signals, said television receiver further including a microphone and a loudspeaker and coupled to a two-wire telephone line, a pseudo-full duplex telephone system comprising:

ring detection means for detecting an incoming ring signal;

first means coupled to said ring detection means for providing a visual and audio indication to said user of an incoming ring signal;

signal control means coupled to said microcomputer and said microphone for muting an audio signal from said microphone in response to a user selected input command;

display means coupled to said signal control means for providing a visual indication to said user of the muting of an audio signal from said microphone;

differential coupling means;

switch means selectively coupling said ring detection means and said differential coupling means to said telephone line, said switch means coupled to said microcomputer and responsive to control signals therefrom for decoupling said ring detection means from said telephone line and coupling said differential coupling means thereto following detection of an incoming ring signal in response to a user selected input command;

line balance means connecting said microphone to said differential coupling means for providing an audio signal received by said microphone to said telephone line and connecting said differential coupling means to said loudspeaker for providing a received telephone signal to said loudspeaker;

variable impedance means connected to said line balance means for varying the impedance thereof in accordance with the impedance of said telephone line; and signal processing means coupled to said variable impedance means and to said line balance means and responsive to an output signal provided by said line balance means to said loudspeaker during the transmission of an audio signal from said microphone to said telephone line for selectively coupling said variable impedance means in circuit with said line balance means in matching the impedance of said telephone system with that of said telephone line.

8. In a television receiver including a microcomputer-controlled tuning system, said microcomputer responsive to user selected input commands for generating control signals, said television receiver further including a microphone and a loudspeaker and coupled to a two-wire telephone line, a pseudo-full duplex telephone system comprising:

ring detection means for detecting an incoming ring signal;

first means coupled to said ring detection means for providing a visual and audio indication to said user of an incoming ring signal;

signal control means coupled to said microcomputer and said microphone for muting an audio signal from said microphone in response to a user selected input command;

display means coupled to said signal control means for providing a visual indication to said user of the muting of an audio signal from said microphone;

differential coupling means;

switch means selectively coupling said ring detection means and said differential coupling means to said telephone line, said switch means coupled to said microcomputer and responsive to control signals therefrom for decoupling said ring detection means from said telephone line and coupling said differential coupling means thereto following detection of an incoming ring signal in response to a user selected input command;

line balance means connecting said microphone to said differential coupling means for providing an audio signal received by said microphone to said telephone line and connecting said differential coupling means to said loudspeaker for providing a received telephone signal to said loudspeaker;

variable impedance means connected to said line balance means for varying the impedance thereof in accordance with the impedance of said telephone line;

signal processing means coupled to said variable impedance means and to said line balance means and responsive to an output signal provided by said line balance means to said loudspeaker during the transmission of an audio signal from said microphone to said telephone line for selectively coupling said variable impedance means in circuit with said line balance means in matching the impedance of said telephone system with that of said telephone line; and audio switching means coupling said line balance means to said loudspeaker and coupled to said microcomputer for automatically decoupling television audio signals and coupling telephone signals to said loudspeaker in response to a control signal from said microcomputer following detection of an incoming ring signal.

9. A pseudo-full duplex telephone system having a microphone and a loudspeaker, said telephone system comprising:

differential coupling means for connection to a two-wire telephone line;

line balance means connecting said microphone to said differential coupling means for providing an audio signal received by said microphone to said telephone line and connecting said differential coupling means to said loudspeaker for providing a received telephone signal to said loudspeaker;

variable impedance means connected to said line balance means for varying the impedance thereof in accordance with the impedance of said telephone line; and signal processing means coupled to said variable impedance means and to said line balance means and responsive to an output signal provided by said line balance means to said loudspeaker during the transmission of an audio signal from said microphone to said telephone line for selectively coupling in circuit said variable impedance means to said line balance means in matching the impedance of said telephone system with that of said telephone line.

10. The system of claim 9 wherein said line balance means comprises a bridge circuit with said variable impedance means and said differential coupling means connected to separate branches of said bridge circuit.

11. The system of claim 10 wherein said variable impedance means comprises a plurality of capacitors and resistors coupled in parallel between said signal processing means and line balance means with each capacitor and resistor responsive to a control signal from said signal processing means for changing the impedance of said telephone system.

12. The system of claim 9 wherein said signal processing means includes:

memory means for storing a predetermined signal level;

comparison means coupled to said memory means and to said line balance means for reading said predetermined signal level from said memory means and for comparing said output signal with said predetermined signal level; and logic means coupled to said comparison means and to said variable impedance means for coupling said variable impedance means and said line balance means when said output signal exceeds said predetermined signal level.

13. The system of claim 9 wherein said differential coupling means comprises an isolation transformer having a primary coupled to said telephone line and a secondary coupled to said line balance means.

14. The system of claims 1 or 9 wherein said signal processing means further includes:

signal detection means coupled to said microphone for receiving said audio signal therefrom;

counting means coupled to said signal detection means for measuring a predetermined time interval following the termination of said audio signal; and tone generating means for providing a reference signal to said line balance means following said predetermined time interval in thus periodically providing a reference signal to said signal processing means through said line balance means for periodically measuring the impedance balance of said line balance means and for correcting for changes in telephone line impedance.

15. The system of claims 1 or 9 further including automatic gain control means coupled to said microphone for providing said microphone audio signal to said signal processing means, said signal processing means including signal level measuring and comparing means for comparing the level of said audio signal with a reference signal level and for providing a control signal to said automatic gain control means in regulating the level of the audio signal from said microphone.

16. A pseudo-full duplex telephone system having a microphone and a loudspeaker, said telephone system comprising:

differential coupling means for connection to a two-wire telephone line;

line balance means connecting said microphone to said differential coupling means for providing an audio signal received by said microphone to said telephone line and connecting said differential coupling means to said loudspeaker for providing a received telephone signal to said loudspeaker, said line balance means including a bridge circuit having first and second branches, with said first branch coupled to said differential coupling means;

variable impedance means including a plurality of capacitors and resistors connected in parallel to the second branch of said line balance means for varying the impedance thereof in accordance with the impedance of said telephone line; and signal processing means coupled to said variable impedance means and to said line balance means and responsive to an output signal provided by said line balance means to said loudspeaker during the transmission of an audio signal from said microphone to said telephone line for selectively coupling said variable impedance means in circuit with said line balance means in matching the impedance of said telephone system with that of said telephone line.

17. A pseudo-full duplex telephone system having a microphone and a loudspeaker, said telephone system comprising:

differential coupling means for connection to a two-wire telephone line;

line balance means connecting said microphone to said differential coupling means for providing an audio signal received by said microphone to said telephone line and connecting said differential coupling means to said loudspeaker for providing a received telephone signal to said loudspeaker, said line balance means including a bridge circuit having first and second branches, with said first branch coupled to said differential coupling means;

variable impedance means including a plurality of capacitors and resistors connected in parallel to the second branch of said line balance means for varying the impedance thereof in accordance with the impedance of said telephone line;

signal processing means coupled to said variable impedance means and to said line balance means and responsive to an output signal provided by said line balance means to said loudspeaker during the transmission of an audio signal from said microphone to said telephone line for selectively coupling said variable impedance means in circuit with said line balance means in matching the impedance of said telephone system with that of said telephone line; and automatic gain control means coupled to said microphone for providing said microphone audio signal to said signal processing means, said signal processing means including signal level measuring and comparing means for comparing the level of said audio signal with a reference signal level and for providing a control signal to said automatic gain control means in regulating the level of the audio signal from said microphone.

* * * * *